United States Patent Office 2,802,883
Patented Aug. 13, 1957

2,802,883

PREPARATION OF 2-TERTIARY-ALKYL-4,6-DINITROPHENOLS

Andrew J. Dietzler, Midland, Mich., assignor to The Dow Chemical Company, Midland, Mich., a corporation of Delaware No Drawing. Application March 22, 1956,
Serial No. 573,096

7 Claims. (Cl. 260—622)

This invention relates to alkyl-dinitrophenols and more particularly to 2-tertiary-alkyl-4,6-dinitrophenols and to an improved method of preparing the same.

Indirect methods of preparing 2-tertiary-alkyl-4,6-dinitrophenols are known. Ipatieff et al. in J. Am. Chem. Soc. 60, 2497 (1938) show butylation of para-nitrophenol with isobutylene in the presence of phosphoric acid followed by nitration of the 2-tertiary-butyl-4-nitrophenol, formed thereby, with concentrated nitric acid and acetic acid to 2-tertiary-butyl-4,6-dinitrophenol having a melting point of 122° to 126° C. Ipatieff et al., ibid., also show nitration of 2,4-di-tertiary-butylphenol to 2-tertiary-butyl-4,6-dinitrophenol. Hart et al. in J. Am. Chem. Soc. 73, 3179 (1952) describe a method of nitrating 2,6-di-tertiary-butylphenol with concentrated nitric acid and acetic acid to 2-tertiary-butyl-4,6-dinitrophenol having a melting point of 124°–125° C. U. S. Patent 2,192,197 describes the preparation of 2-tertiary-alkyl-4,6-dinitrophenols by treating an ortho-tertiary-alkylphenol with concentrated sulfuric acid followed by nitric acid. The reaction product was not substantially pure 2-tertiary-alkyl-dinitrophenol. For example, when ortho-tertiary-butylphenol was used, the melting point of the reaction product was about 85° C. This low melting point indicates the presence of appreciable amounts of the para-butyl isomer, i. e., 4-tertiary-butyl-2,6-dinitrophenol, rather than consisting substantially entirely of the ortho form, i. e., 2-tertiary-butyl-4,6-dinitrophenol. The presence of the para isomer is undesirable. 2-tertiary-butyl-4,6-dinitrophenol is an excellent herbicide and fungicide, whereas the 4-tertiary-butyl-2,6-dinitrophenol is not a good herbicide or fungicide. The direct nitration of ortho-tertiary-butylphenol is of especial importance, in an economic sense, because it can be prepared from isobutylene, a readily available raw material.

The difficulties encountered in attempting to dinitrate directly the 2 and 4 carbon atoms on an ortho-tertiary-alkylphenol are overcome by preparing it according to the novel method of the present invention.

I have discovered an improved and commercially practical method of preparing 2-tertiary-alkyl-4,6-dinitrophenol by directly nitrating the corresponding ortho-tertiary-alkylphenol wherein no objectionable oxidation or rearrangement occurs. According to the invention, a good yield of a high quality product, useful in the preparation of herbicidal, fungicidal, insecticidal, and pharmaceutical materials, is readily obtainable.

The invention is practiced by slowly mixing an ortho-tertiary-alkylphenol, in an organic liquid medium such as carbon tetrachloride or perchloroethylene, with an aqueous solution of nitric acid at a temperature of from 0° to 75° C., but preferably at from 15° to 25° C. The ortho-tertiary-alkylphenol is preferably added dropwise to the nitric acid. Higher temperatures than 60° are not recommended because there is a danger of the formation of unstable substances; a lower temperature than 15° C. results in an undesirably slow reaction. The addition period employed is usually 0.5 to 3 hours; it is dependent somewhat upon the batch size as well as upon the effectiveness of the cooling means mentioned below. The strength of the nitric acid may be 20 to 60 percent by weight, but is usually 40 to 50 percent. A molar ratio of 2 to 5 moles of the acid to 1 mole of the alkylphenol is recommended. The reaction is exothermic and, therefore, a cooling means is advisable for temperature control. Best results are obtainable when the alkylphenol-nitric acid reaction mixture undergoes a soaking period of from 0.5 to 10 hours, after the addition period, at a temperature of from 0° to about 75° C. For example, a soaking period of about 2 hours at about 40° C. gives good results. The reaction produces water as an incidental product and a 2-tertiary-alkyl-4,6-dinitrophenol as the organic reaction product sought. Some evidence of crystallization of the reaction product may be observed during the soaking period.

One embodiment of the invention comprises increasing the temperature of the reaction mixture at the close of the soaking period to about 60° C. to dissolve any organic reaction product which has precipitated or crystallized out of the organic medium. The reaction mixture stratifies into an upper aqueous phase and a lower oil phase which consists essentially of the organic liquid medium and the organic reaction product. The phases or layers may be separated by conventional separatory means as by a separatory funnel. The oil layer may be washed with water, if desired, to remove any unreacted nitric acid. The oil is then steam distilled to remove the organic solvent. The residue, comprising the crystalline 2-tertiary-alkyl-4,6-dinitrophenol and water, is cooled to about 25° C. and filtered; the crystalline material is then washed and dried.

The filtration temperature is not critical when the solvent has been thus removed from the crude 2-tertiary-alkyl-6-dinitrophenol by steam distillation. The washing time should be sufficient to substantially remove all residual nitric acid. The drying temperature is largely a matter of convenience. Anywhere below 100° C. may be used; 60° C. to 80° C. is very good.

Further purification may be carried out by dissolving the crystals in a good solvent, e. g., boiling ethanol, and recrystallizing the 2-tertiary-alkyl-4,6-dinitrophenol.

An alternative means of purifying the crystalline 2-tertiary-alkyl-4,6-dinitrophenol is to dissolve the crystals in a 1 to 5 percent aqueous solution of an alkali metal hydroxide, e. g., sodium hydroxide, and thereafter add thereto hydrochloric or hydrobromic acid. A finely divided 2-tertiary-alkyl-4,6-dinitrophenol forms, settles out, and is removable by filtration.

The degree of purity of the 2-tertiary-alkyl-4,6-dinitrophenol may be ascertained by determining the melting point. For example, the melting point of a technical 2-tertiary-butyl-4,6-dinitrophenol is 120° to 127° C. The melting point of substantially pure 2-tertiary-butyl-4,6-dinitrophenol is 127.4°–128.7° C.

A preferred embodiment of the invention, however, is to effect crystallization of a large proportion of the 2-tertiary-alkyl-4,6-dinitrophenol, at the close of the soaking period, by chilling the reaction mixture to between 0° to 5° C., as by pouring it over chipped ice. The crystallized 2-tertiary-alkyl-4,6-dinitrophenol is thereafter separated by filtration. The filtration is best carried on, when practicing the invention according to the preferred manner of the invention, at between 0° to 5° C., although somewhat higher temperatures may be used. A filtration temperature, however, above 20° C. is not recommended because an undesirable amount of the reaction product may thereby be allowed to remain in the solvent. The separated crystals are washed with water and dried. The oil and water comprise the filtrate. Oil is herein used to denote the organic solvent and some organic reaction product. Upon brief standing, the filtrate stratifies and is thereafter easily separated into a water phase and an oil phase, as above, by a conventional separatory means. The separated oil phase, containing a small proportion of the tertiary-alkyl-4,6-dinitrophenol, is recycled, i. e., used without further treatment as the organic solvent in subsequent runs in the preparation of additional amounts of the same 2-tertiary-alkyl-4,6-dinitrophenol. Not only are the above mentioned steps of steam distillation and dissolution and recrystallization eliminated, but the percent yield and purity are enhanced, and the efficiency of the operation is improved by recycling the used organic liquid solvent. It is necessary to add only sufficient fresh organic solvent to replace that which is not recovered as a result of operational handling losses and to adsorption on the crystalline product. It might be noted, however, that substantially all the solvent may be ultimately recovered when the operation is conducted in a closed system, although a small portion is not available for recycling.

The used oil, which is recycled in subsequent runs, may be used repeatedly in successive runs. For practical purposes the same oil, replenished by an amount equal to that lost in the former run, may be used in innumerable subsequent runs. Although there appears to be no diminishment in the effectiveness of the method regardless of the number of times the same oil is recycled, some deterioration and contamination is possible and may be ascertained by an examination of the oil after long use.

A wide choice of solvents is possible in practicing the invention among which are carbon tetrachloride, benzene, toluene, chloroform, dichloromethane, methylchloroform, methylene chloride, ethylene dichloride, perchloroethylene (tetrachloroethylene) and ortho-dichlorobenzene. Of these, carbon tetrachloride offers certain advantages in low cost, ready availability, and non-flammability. Perchchloroethylene offers some advantages over carbon tetrachloride in having a higher boiling point and being less toxic.

Among the ortho-tertiary-alkylphenols which can be nitrated according to the invention are the butyl, amyl, hexyl, and octyl ortho-tertiary phenols.

The method of making a 2-tertiary-alkyl-4,6-dinitrophenol according to the present invention, including the recycling feature, lends itself well to continuous operations.

Specific ways of practicing the novel method of the invention are made manifest in the following examples, and the salient principles to be concluded from the examples are set out in Table I immediately following the last example.

EXAMPLE 1

A quantity of 252 grams (2.0 moles) of 50% aqueous nitric acid solution was placed in a one-liter flask equipped with a stirrer, a reflux condenser, a dropping funnel, and a thermometer positioned to subtend below the level of the contents of the flask. To this, at 25° C., were added dropwise, with stirring, 75 grams (0.5 mole) of o-tert-butyl-phenol in 200 ml. of carbon tetrachloride. This was a molar ratio of 4 nitric acid to 1 of the phenol. 1.3 hours were used for the addition period. The temperature was maintained at 20°-25° C. during the addition period. The reaction mixture was also held at 20°-25° C. for a soaking period of one hour. The organic reaction product, 2-tert-butyl-4,6-dinitrophenol, was formed. The reaction mixture, after addition of the o-tert-butylphenol, was warmed to about 60° C. to insure solution of the organic reaction product. The carbon tetrachloride, containing the reaction product, in solution, was separated and the carbon tetrachloride removed by steam distillation. The residue was thereafter filtered at about 25° C. The solids were washed with water at room temperature and then dried at about 80° C. The melting point of the dried solids was 120°-125° C. The 2-tert-butyl-4,6-dinitrophenol obtained was 72.4% of the theoretical yield, based upon the weight of o-tert-butylphenol consumed.

EXAMPLE 2

Example 1 was repeated except the strength of the nitric acid was 30% instead of 50%, the addition time reduced to 0.4 hour and the soaking time increased to 2.5 hours. The yield of 2-tert-4,6-dinitrophenol was 52.8%, based upon the o-tert-butylphenol. The melting point of the final reaction product was 97°-120° C.

EXAMPLE 3

Example 1 was repeated except the strength of the nitric acid was increased to 35.4%, the addition time was 1.25 hours and the soaking time was 1 hour. The yield was 56% based upon the o-tert-butylphenol consumed. The melting point of the final product was 101°-121° C.

EXAMPLE 4

Example 1 was repeated except the nitric acid strength was increased to 71%, i. e., to the strength of concentrated nitric acid; the addition time was 1.75 hours and the soaking time was 2 hours; the melting point of the final product was 112.5°-122.5° C. The yield was 79.6% of the o-tert-butylphenol. There was evidence of oxidation in this example.

EXAMPLE 5

Example 1 was repeated but the molar ratio of nitric acid to 2-tert-butylphenol was changed to 2:1 and the soaking time was increased from 1 hour to 2 hours. The yield was 80% based on the o-tert-butylphenol. The melting point of the final product was 94.5°-110° C.

EXAMPLE 6

Example 5 was repeated except the percent strength of the nitric acid was that of Example 4, i. e., 71%. The yield of 2-tert-butyl-4,6-dinitrophenol was 75.8%, based upon the o-tert-butylphenol. The melting point was 84°-115° C. Again there was oxidation as in Example 4.

EXAMPLE 7

Example 1 was repeated except the molar ratio of the 50% nitric to o-tert-butylphenol was 2.4:1; the addition and soaking temperatures were 40° C.; the addition time was 1.7 hours; and the soaking time was 6 hours. The yield was 82% based on the o-tert-butylphenol. The melting point of the 2-tert-butyl-4,6-dinitrophenol was 110°-124° C.

EXAMPLE 8

Example 7 was repeated but the molar ratio of nitric acid to o-tert-butylphenol was 3:1. The yield was 82.3 percent based on the o-tert-butylphenol. The melting point of the end product was 115°-126° C.

EXAMPLE 9

Example 8 was repeated except the soaking time was decreased to 2 hours. The percent yield and melting point of the end product were little affected, the former being 83.3%, based upon the o-tert-butylphenol, and the latter being 114.5°-124.5° C.

EXAMPLE 10

To a quantity of 189 g. (0.5 moles) of 50% nitric acid, in an apparatus similar to that used in the above examples, was added dropwise, with stirring, a solution of 82.1 g. (0.5 mole) of o-tert-amylphenol in 100 cc. of carbon tetrachloride. A period of 1.08 hours was taken for the addition during which the temperature was maintained at 20° to 25° C. The mixture was then warmed to 40° C. in 30 min. and soaked at 36°-41° C. for 3 hours.

The oil and aqueous layers were then separated. The oil layer was washed with water. The water washes and aqueous layer were combined and analyzed for $HNO_3$.

0.478 mole of $HNO_3$ was found; thus 1.02 moles of $HNO_3$ were consumed in the reaction.

The washed oil was then steam distilled, as in the former examples, to remove the carbon tetrachloride; 95 cc. of wet carbon tetrachloride were recovered. The residue in the flask was cooled to 2°–3° C. The crystals which formed were filtered, washed with water, and dried in a vacuum oven for 16 hours at 40° C. An orange to red product, of a freezing point of 47.8° in the amount of 110 g., was obtained. The yield of this crude product, based on the o-tert-amylphenol consumed, was 86.7%. This material was recrystallized from ethyl alcohol giving a product having a melting point of 66.8–67.5° C. and a yield of 66.4% based upon the o-tert-amylphenol consumed. This product was a yellow crystalline solid. Elemental analysis gave the following results:

*Weight percent*

|  | Found | Calculated |
|---|---|---|
| Carbon | 52.38 | 52.0 |
| Hydrogen | 5.38 | 5.55 |
| Nitrogen | 10.8 | 11.0 |

Infrared analysis of this product indicated that it was over 99% 2-tert-amyl-4,6-dinitrophenol. This product is a new compound, useful for the purposes set out hereinbefore for 2-alkyl-4,6-dinitrophenols.

The data of Examples 1 to 10 are set out in the following Table I.

TABLE I

| Example | Molar Ratio | Percent $HNO_3$ | Soaking Temp., °C. | Time, Hours Addition | Time, Hours Soaking[1] | Percent Yield[2] | M. P. of product in °C. |
|---|---|---|---|---|---|---|---|
| 1 | 4:1 | 50 | 20-25 | 1.3 | 1.0 | 72.4 | 120-125 |
| 2 | 4:1 | 30 | 20-25 | 0.4 | 2.5 | 52.8 | 97-120 |
| 3 | 4:1 | 35.4 | 20-25 | 1.25 | 1.0 | 56.0 | 101-121 |
| 4 | 4:1 | 71 | 20-25 | 1.75 | 2.0 | 79.6 | 112.5-122.5 |
| 5 | 2:1 | 50 | 25 | 1.5 | 2.0 | 80.0 | 94.5-110 |
| 6 | 2:1 | 71 | 25 | 1.5 | 2.0 | 75.8 | 84-115 |
| 7 | 2.4:1 | 50 | 40 | 1.7 | 6.0 | 82.0 | 110-124 |
| 8 | 3:1 | 50 | 40 | 1.7 | 6.0 | 82.3 | 115-126 |
| 9 | 3:1 | 50 | 40 | 1.7 | 2.0 | 83.3 | 114.5-124.5 |
| 10 | 3:1 | 50 | 40 | 1.08 | 3.5 | [3] 66.4 | 55.8-67.5 |

[1] The soaking time includes the time taken to bring the reaction mixture up to soaking temperature.
[2] Based upon the o-tert-alkylphenol consumed.
[3] Note that this yield was that of the product resulting from a separate purification step.

In Examples 1 to 10 above laboratory-size batches were used. Examples 11 to 15 below were semiplant size operations which required increased weights of o-tert-butylphenol, nitric acid, and carbon tetrachloride. The procedure was substantially that followed in Examples 1 to 10 except in Examples 12 to 15, wherein the recovered oil from a preceding run or runs was recycled in one or more subsequent runs.

EXAMPLE 11

33.1 lbs. (0.263 mole) of 50% aqueous nitric acid and 14 lbs. of carbon tetrachloride were loaded into a 10 gallon Pfaudler kettle, equipped with a high speed propeller stirrer. This mixture was maintained at about 19° C. with stirring. 13.1 lbs. (0.087 mole) of o-tert-butylphenol in 14 lbs. of carbon tetrachloride were then added portionwise at a temperature of about 19–23° C. over an addition period of 2.25 hours. The resulting reaction mixture was warmed slowly over a period of 1.75 hours to 39.5° C.; it was then soaked at a temperature between 39.5° and 41.5° C. for 2.75 hours more, making a total soaking time of 4.5 hours. The reaction mixture was then dumped into about 40 lbs. of chipped ice to facilitate the crystallization of the dinitrated phenol.

The reaction mixture containing the crystallized product was filtered at about 0° C. The crystals collected on the filter were washed with a total of 75 lbs. of cold water. The oil layer was separated from the aqueous portion of the filtrate. The wet crystals, weighing 15.8 lbs., were dried at 60° C. in a forced air oven for 20 hours. 14.3 lbs. of 2-tert-butyl-4,6-dinitrophenol, having a melting point of 124–127° C., were obtained. The yield based on the weight of o-tert-butyl-phenol was 68%. This yellow product was dry and free-flowing.

EXAMPLE 12

33.1 lbs. (0.263 mole) of 50% $HNO_3$ were loaded into a 10 gallon Pfaudler kettle and cooled with stirring to 20° C. 24.4 lbs. of recovered oil, i. e., carbon tetrachloride, containing some organic reaction products from Example 11 above, were added to the nitric acid with stirring in 5 minutes. No evidence of reaction was observed. To this mixture were then added portionwise 13.1 lbs. (0.087 mole) of o-tert-butyl-phenol in 7.5 lbs. of carbon tetrachloride. This carbon tetrachloride was added to make up for that not recovered for recycling in Example 11 above. Addition time was 2.5 hours at 12–22° C. This mixture was then warmed to 40° C. in 50 min. and kept at 40–42° C. for 2 hours.

The reaction mixture was dumped into about 40 lbs. of ice, and the crystals formed thereby recovered by filtering at about 0° C. The crystals were washed with water and dried at 60° C. for 20 hrs. in a forced air oven. 15.6 lbs. of 2-tert-butyl-4,6-dinitrophenol, having a melting point 123–128° C., were obtained. The yield based on the weight of o-tert-butylphenol was 74.3%. 30.8 lbs. of oil were recovered from the filtrate.

The apparatus used in Example 12 was used in Examples 13 to 15 below. The procedure was generally that followed in Example 12. Deviations from that procedure are stated in the discussion of Examples 13 to 15.

EXAMPLE 13

The oil from Example 12 was recycled in this example, using the same quantities of reactants, i. e., 50% $HNO_3$ and o-tert-butylphenol, as were used in Examples 11 and 12. 4.5 lbs. of carbon tetrachloride to make up for that used up in Example 12, were added. 16.1 lbs. of 2-tert-butyl-4,6-dinitrophenol, melting at 122.5–127.5° C., were obtained; the yield was 76.8% based on the o-tert-butylphenol consumed. 32.5 lbs. of oil were recovered from this run.

EXAMPLE 14

The used oil from Example 13 was recycled in this run in a similar manner to that done in Examples 12 and 13. The weight of reactants was the same as in Examples 11 to 13. A quantity of 4.5 lbs. of $CCl_4$, to make up for that used in Example 13, was added. 17.9 lbs. of 2-tert-butyl-4,6-dinitrophenol, having a melting point 122–127° C., were obtained; the yield based on the o-tert-butylphenol was 85.2%. 30.1 lbs. of oil were recovered from this run.

EXAMPLE 15

The used oil recovered from Example 14 was recycled in this example. The quantity of reactants was as in Examples 11 to 14 above. 7.1 lbs. of $CCl_4$ were added to make up for that used up in Example 14. 16.1 lbs. of 2-tert-butyl-4,6-dinitrophenol, melting at 122.4–217° C. were obtained; the yield was 77% based on the o-tert-butylphenol consumed.

Examples 16 to 21 which follow, were laboratory size batches of similar sizes to those used in Examples 1 to 10. The apparatus and procedure were substantially those used in Examples 1 to 10 but the organic solvent used was varied. The variations are set out under Examples 16 to 21.

EXAMPLE 16

150 grams (1 mole) of o-tert-butylphenol were added dropwise, with stirring, over a period of 2.5 hours at 24–26° C., to a mixture of 378 grams (3 moles) of 50% aqueous nitric acid in 200 cc. of methylchloroform. This mixture was warmed to 40° C. in 10 minutes and kept at 40° C. for 30 minutes. The aqueous layer was removed and the oil layer washed twice with 200 cc. portions of water at 40° C. The oil layer was then steam distilled to remove the methylchloroform. At this point the residue, consisting of water and the crystalline product, was cooled to 35° C. and filtered. The crystals were washed with water and dried at 60° C.

EXAMPLE 17

75 grams (0.5 mole) of o-tert-butylphenol in 100 cc. of methylene chloride were added dropwise with stirring over 1.5 hours to a mixture of 189 grams (1.5 moles) at 24–27° C. of 50% nitric acid and 100 cc. of methylene chloride. The reaction mixture was warmed to 38° C. in 40 min. and kept at 38–40° C. for 2 hours. The water layer was removed and the oil washed with water. The methylene chloride was removed by steam distillation, the residue cooled to 25° C., and the crystals therein removed by filtration. The crystals were washed with water and dried at 60° C. 97.9 grams of 2-tert-butyl-4,6-dinitrophenol, having a melting point 106–124° C., were obtained; the yield based upon the o-tert-butylphenol was 81.5%. This product was dark red in color and slightly oily.

EXAMPLE 18

94.5 grams (0.74 mole) of 50% nitric acid and 25 cc. of chloroform were combined. To the mixture were added with stirring, at 24–25° C., a solution of 37.5 grams (0.25 mole) of o-tert-butylphenol in 25 cc. of chloroform. Addition time was one hour. The mixture was then warmed to 40° C. in 8 minutes and kept at 40–42° C. for 2 hours. 100 cc. of water were added to the mixture, and the aqueous phase separated from the oil phase. The oil and crystals were washed with water and then steam distilled to remove the chloroform. The residue in the flask was cooled to 20° C. and filtered. The crystalline 2-tert-butyl-4,6-dinitrophenol was washed with water and dried. The yield, based upon the o-tert-butylphenol was 83.2%.

EXAMPLE 19

37.5 grams (0.25 mole) of o-tert-butylphenol in 25 cc. of ethylene dichloride were added dropwise with stirring in 59 minutes, at 23°–25° C., to a mixture of 94.5 grams (0.75 mole) of 50% nitric acid and 25 cc. of ethylene dichloride. The resulting mixture was then warmed to 40° C. in 10 minutes and kept at 38–43° C. for 2 hours. There was some evidence of crystallization of the 2-tert-butyl-4,6-dinitrophenol formed by the reaction. 100 cc. of water were added and the aqueous layer removed. The oil and crystals were washed three times with 100 cc. portions of water at 40–50° C., and then steam distilled to remove the ethylene dichloride. The residue in the still was cooled to 20° C. and filtered. The crystals were washed with water and finally dried at 50° C. 49 grams of 2-tert-butyl-4,6-dinitrophenol, having a melting point of 120–125° C., were obtained; the yield based on the o-tert-butylphenol was 81.6%.

EXAMPLE 20

37.5 grams (0.25 mole) of o-tert-butylphenol in 25 cc. of perchloroethylene were added dropwise with stirring and cooling in 53 minutes at 23–26° C. to a mixture of 94.5 grams (0.75 mole) of 50% nitric acid and 25 cc. of perchloroethylene. This mixture was then warmed to 40° C. in 20 min. and kept at 38–42° C. for 2 hours. 100 cc. of water were added; the mixture was stirred for about 5 minutes; the aqueous layer was removed at about 40° C. The oil phase was washed with water at 40–50° C. The water washes were extracted with 25 cc. of perchloroethylene to recover the fine crystals of product which had sucked over with the aqueous phase. These extracts were added to the main product, and the product steam distilled to remove the perchloroethylene. The still residue was cooled to 20° C. and filtered. The crystals were washed with water and dried at 50° C. 44 grams of 2-tert-butyl-4,6-dinitrophenol, having a melting point 120–215° C., were obtained. The yield, based on the o-tert-butylphenol consumed was 73.3%.

EXAMPLE 21

37.5 grams (0.25 mole) of o-tert-butylphenol in 25 cc. of o-dichlorobenzene were added dropwise with stirring in 60 minutes to a mixture of 94.5 grams (0.75 mole) of 50% nitric acid and 25 cc. of o-dichlorobenzene which was maintained at a temperature of 23° to 25° C. This mixture was then warmed to 40° C. and kept at 38–42° C. for 2 hours. This reaction mixture was then warmed to 40° C. and kept at 38–42° C. for 2 hours. This reaction mixture was thereafter treated as described in Example 20 above. 48 grams of 2-tert-butyl-4,6-dinitrophenol, having a melting point of 118–125° C. were obtained; the yield was 80% based on the o-tert-butylphenol.

Example 22 below is a laboratory size batch in which a novel method of purification of the crystalline reaction product is illustrated.

EXAMPLE 22

189 grams (1.5 moles) of 50% nitric acid were heated with stirring to 40° C. To this solution with stirring and cooling (to overcome the heat of reaction) were added dropwise 75 grams (0.5 mole) of o-tert-butyl-phenol in 100 cc. of carbon tetrachloride over a period of 1.5 hours at 38–41° C. This mixture was soaked at 40° C. for 6 hours and then warmed to 60° C. The oil layer was separated. The carbon tetrachloride was removed from the oil by steam distillation. After the removal of the CCl₄, the residue in the still pot was cooled to 25° C. to effect better crystallization, and thereafter filtered. The solids were washed with water and dried at 80° C. 98.8 grams of yellow-orange product, having a melting point 115–125° C. were obtained, the yield was 83.3% based on the o-tert-butylphenol.

A novel method of purifying crystals of o-tert-alkyl-4,6-dinitrophenol was carried out in this example as set out in the following paragraph.

20 grams of the crude product above (melting point 115–126° C.) were dissolved in 102 grams of 3.3% aqueous NaOH at 40° C. A clear solution resulted. To this solution at 40° C. were added 19 cc. of 5 N hydrochloric acid with stirring. A finely divided tan solid separated. This solid was filtered, washed with water and dried at 50° C. 19.2 grams of a light tan solid, having a melting point 121–125° C., were obtained. The recovery was 96% of the dissolved crystalline crude product. This product was obviously of a high degree of purity and the recovery by this novel method of purification high.

The examples show that the percent strength of the nitric acid is highly important. Examples 2 and 3 show that when the percentage strength is substantially below 50%, the percent yield is low and the purity of the end product, as shown by the melting point, is low. On the other hand, Examples 4 and 6 show that when the percent strength of the acid is substantially above 60%, e. g., 71%, there was evidence of oxidation of the alkyl group.

Other examples show operating conditions which yield a substantially pure product, but nowise exhaust the operating conditions which fall within the scope of the invention.

Example 10 shows the application of the method of my invention to the preparation of a new and useful chemical compound.

Examples 12 to 15 clearly show the superiority of the recycling step of my invention. When the high quality and yield obtained by the recycling step are compared to those obtained by the relatively costly conventional step of removal of the solvent liquors by steam distillation or by steam distillation followed by dissolution and recrystallization of the end product, the superiority of the step is readily apparent.

Examples 16 to 21 show the effect of varying the organic solvent and suggest small adjustments in operating conditions which reflect the solvent used.

Example 22 shows an effectual novel procedure for dissolving freshly formed 2-tert-alkyl-4,6-dinitrophenol crystals by the use of an alkali metal hydroxide and recovering a very high percent of the 2-tert-alkyl-4,6-dinitrophenol by recrystallizing it in a mineral acid to obtain the desired product in a much purer form.

Although, as has been pointed out early in this specification, it is known in the art to make alkyl-dinitrophenols by adding concentrated sulfuric acid to o-tert-butyl-phenol and thereafter nitrating the sulfonic acid that was formed thereby by treating with nitric acid, it has been shown that this method is unsatisfactory where a 2-tert-alkyl 6-dinitrophenol is desired which is undiluted or uncontaminated with an isomeric form of the desired product, e. g., 4-tert-alkyl-2,6-dinitrophenol due to rearrangement of the substituents on the phenol nucleus. Such undilution and uncontamination are highly desirable in fungicides and pharmaceuticals. Therefore, methods of directly nitrating an ortho-tertiary-alkylphenol, which were heretofore known, are unsatisfactory when a high yield of good quality 2-tertiary-alkyl-4,6-dinitrophenol is required.

The invention clearly shows that such direct nitration of an ortho-tert-alkylphenol is accomplished by the action of nitric acid, preferably of 40% to 50% strength, without the aid of sulfuric acid as is common practice, when the process of my invention as set out hereinabove is followed.

Having thus described my invention, what I claim and desire to protect by Letters Patent is:

1. The method of making 2-tertiary-alkyl-4,6-dinitrophenol which is substantially free from its isomers consisting essentially of slowly adding an aqueous solution of nitric acid of from 20 to 60 weight percent concentration to an ortho-tertiary-alkylphenol in an organic liquid reaction medium in the ratio of 1 mole of the acid to between 2 and 5 moles of the alkylphenol at a temperature of between 0° and 60° C. and reacting the resulting mixture at a temperature of between 10° and 60° C. for from 0.5 to 10 hours.

2. The method of making 2-tertiary-alkyl-4,6-dinitrophenol which is substantially free from its isomers comprising the steps of: preparing a solution of one molecular equivalent of an ortho-tertiary-alkylphenol in an organic liquid reaction medium; adding slowly said solution to an aqueous nitric acid solution of from 40 to 50 weight percent concentration in an amount containing from 2.4 to 4 moles of nitric acid at a temperature between 0° and 60° C.; soaking the resulting mixture for from 0.5 to 10 hours at a reaction temperature of from 10° to 60° C. whereby said 2-tertiary-alkyl-4,6-dinitrophenol is formed by such reaction; causing a stratification of the reaction mixture into an upper aqueous phase and a lower organic phase which contains the 2-tertiary-alkyl-4,6-dinitrophenol; removing said aqueous layer; crystallizing said 2-tertiary-alkyl-4,6-dinitrophenol; and separating said crystalline 2-tertiary-alkyl-4,6-dinitrophenol from the organic phase.

3. The method of claim 2 wherein the ortho-tertiary-alkyl substituent of the phenol is selected from the class consisting of tertiary-butyl, tertiary-amyl, tertiary-octyl, and tertiary-hexyl.

4. The method of claim 2 wherein the organic medium is selected from the group consisting of carbon tetrachloride, dichloromethane, benzene, toluene, perchloroethylene, ethylene dichloride, chloroform, ortho-dichlorobenzene, methylene chloride and methyl chloroform.

5. The method of claim 2 wherein the step of crystallizing said 2-tertiary-alkyl-4,6-dinitrophenol is effected by reducing the temperature of said organic phase to 0° to 5° C.

6. The method of claim 2 wherein the organic medium which was separated from the crystalline 2-tertiary-alkyl-4,6-dinitrophenol is employed as a substantial portion of the reaction medium in a subsequent preparation of the 2-tertiary-alkyl-4,6-dinitrophenol.

7. The method of claim 2 wherein the recovery of the crystalline 2-tertiary-alkyl-4,6-dinitrophenol includes the step of dissolving the freshly crystallized product in a 1 to 5 percent aqueous alkali metal hydroxide solution, and precipitating the product with hydrochloric acid at 30°–50° C.

References Cited in the file of this patent
UNITED STATES PATENTS 2,222,486    Moore _____ Nov. 19, 1940

OTHER REFERENCES

Baroni et al.: Monat. fur. Chem., vol. 68 (1936), pp. 251–260 (10 pages).